United States Patent [19]
Linhart et al.

[11] Patent Number: 5,851,300
[45] Date of Patent: Dec. 22, 1998

[54] CATIONIC MODIFICATION OF STARCH AND USE OF THE CATIONICALLY MODIFIED STARCH

[75] Inventors: Friedrich Linhart, Heidelberg; Andreas Stange, Mannheim; Rudolf Schuhmacher, Böhl-Iggelheim; Heinrich Hartmann, Limburgerhof; Walter Denzinger, Speyer; Manfred Niessner, Schifferstadt; Claudia Nilz, Rödersheim-Gronau; Wolfgang Reuther, Heidelberg; Hubert Meixner, Ludwigshafen, all of Germany

[73] Assignee: BASF Aktiengesellschaft, Ludwigshafen, Germany

[21] Appl. No.: 817,644

[22] PCT Filed: Oct. 17, 1995

[86] PCT No.: PCT/EP95/04075

§ 371 Date: Apr. 29, 1997

§ 102(e) Date: Apr. 29, 1997

[87] PCT Pub. No.: WO96/13525

PCT Pub. Date: May 9, 1996

[30] Foreign Application Priority Data

Oct. 29, 1994 [DE] Germany .................. 44 38 708.3

[51] Int. Cl.$^6$ .................. C08B 30/12; C08B 30/00; D21H 11/00
[52] U.S. Cl. .................. 127/32; 127/67; 127/71; 162/164.6; 162/168.2; 162/175
[58] Field of Search .................. 127/32, 67, 71; 162/168.2, 175, 164.6

[56] References Cited

U.S. PATENT DOCUMENTS

| | | | |
|---|---|---|---|
| 3,467,608 | 9/1969 | Dishburger et al. | 260/9 |
| 3,674,725 | 7/1972 | Aitken et al. | 260/9 |
| 3,734,820 | 5/1973 | Hoover et al. | 162/168 |
| 4,097,427 | 6/1978 | Aitken et al. | 162/164.3 |
| 4,146,515 | 3/1979 | Buikema et al. | 260/9 |
| 4,818,341 | 4/1989 | Degen et al. | 162/168.2 |
| 4,880,497 | 11/1989 | Pfohl et al. | 162/135 |
| 4,940,514 | 7/1990 | Stange et al. | 162/168.2 |
| 4,978,427 | 12/1990 | Pfohl et al. | 162/168.2 |
| 5,262,008 | 11/1993 | Moensch et al. | 162/168.2 |
| 5,382,324 | 1/1995 | Fischer et al. | 162/168.2 |

FOREIGN PATENT DOCUMENTS

| | | | |
|---|---|---|---|
| 0 282 761 | 9/1988 | European Pat. Off. | D21H 3/02 |
| 0 301 372 | 2/1989 | European Pat. Off. | D21H 211/18 |
| 2 054 739 | 5/1971 | France. | |
| 37 19 480 | of 0000 | Germany | D21H 3/28 |
| 4 127 733 | 2/1993 | Germany | C08F 251/00 |

OTHER PUBLICATIONS

Ullmanns Encyklopadie der technischen Chemie vol. 17, p. 581 month not available.

*Primary Examiner*—Walter D. Griffin
*Assistant Examiner*—Patricia L. Hailey
*Attorney, Agent, or Firm*—Oblon, Spivak, McClelland, Maier & Neustadt, P.C.

[57] ABSTRACT

In a cationic modification process for starch, starch is reacted with polymers that contain amino and/or ammonium groups in an aqueous medium at temperatures from 115° C. to 180° C. under an increased pressure and in the absence of oxidizers, polymerization initiators and alkali. The reaction is conducted so that maximum 10% by weight starch has its molar weight reduced. Also disclosed is the use of the thus obtained reaction products as dry strength agents for paper.

8 Claims, No Drawings

CATIONIC MODIFICATION OF STARCH AND USE OF THE CATIONICALLY MODIFIED STARCH

BACKGROUND OF THE INVENTION

1. Field of the Invention

The present invention relates to a process for cationically modifying starch by reacting starch with polymers which contain amino and/or ammonium groups in an aqueous medium at above the glutinization temperature of the starch in the absence of oxidizing agents, polymerization initiators and alkali.

2. Description of the Background Art

For increasing the dry strength of paper, for example, Ullmanns Encyklopädie der technischen Chemie, 4th edition, Verlag Chemie, Weinheim-N.Y. 1979, Volume 17, page 581, discloses the use of aqueous suspensions of natural starches, which are converted into a water-soluble form by heating, as a pulp additive in papermaking. However, the retention of the starches dissolved in water on the paper fibers in the paper stock is low. An improvement in the retention of natural products on cellulose fibers in papermaking is disclosed, for example, in U.S. Pat. No. 3,734,820. Said publication describes graft copolymers which are prepared by grafting dextran, a naturally occurring polymer having a molecular weight of from 20,000 to 50 million, with cationic monomers, e.g. diallyldimethylammonium chloride, mixtures of diallyldimethylammonium chloride and acrylamide or mixtures of acrylamide and basic methacrylates, such as dimethylaminoethyl methacrylate. The graft polymerization is preferably carried out in the presence of a redox catalyst.

U.S. Pat. No. 4,097,427 discloses a process for cationically modifying starch, in which the cooking of the starch is carried out in an alkaline medium in the presence of water-soluble quaternary ammonium polymers and of an oxidizing agent. Suitable quaternary ammonium polymers include quaternized diallyldialkylamino polymers or quaternized polyethyleneimines. Examples of oxidizing agents used are ammonium persulfate, hydrogen peroxide, sodium hypochlorite, ozone and tert-butyl hydroperoxide. The modified cationic starches which can be prepared in this manner are added to the paper stock as dry strength agents in papermaking. However, waste water has a very high COD (chemical oxygen demand).

U.S. Pat. No. 4,146,515 discloses a process for the preparation of cationic starch which is used for surface sizing and coating of paper products and paper products [sic]. According to this process, an aqueous suspension of oxidized starch is digested together with a cationic polymer in a continuous digester. Suitable cationic polymers are condensates of epichlorohydrin and dimethylamine, polymers of diallyldimethylammonium chloride, quaternized reaction products of ethylene chloride and ammonia, quaternized polyethyleneimine and quaternized polyepichlorohydrin.

U.S. Pat. No. 3,467,608 discloses a process for the preparation of a cationic starch, in which a suspension of starch in water is heated together with a polyalkyleneimine or polyalkylenepolyamine having a molecular weight of at least 50,000 for from about 0.5 to 5 hours at from about 70° to 110° C. The mixture contains from 0.5 to 40% by weight of polyalkyleneimine or polyalkylenepolyamine and from 99.5 to 60% by weight of starch. According to Example 1, a polyethyleneimine having an average molecular weight of about 200,000 is heated in dilute aqueous solution with potato starch for 2 hours at 90° C. The modified potato starch can be precipitated in a mixture of methanol and diethyl ether. The reaction products of starch and polyethyleneimine or polyalkylenepolyamines are described in U.S. Pat. No. 3,467,608 and are used as flocculants.

EP-A-0 282 761 and DE-A-3 719 480 disclose production processes for paper, board and cardboard having high dry strength. In this process [sic] the dry strength agents used are reaction products which are obtainable by heating natural potato starch with cationic polymers, such as polymers or polyethyleneimines containing vinylamine, N-vinylimidazoline or diallyldimethylammonium units in an aqueous medium to above the glutinization temperature of the starch in the absence of oxidizing agents, polymerization initiators and alkali.

EP-B-0 301 372 discloses a similar process in which appropriately modified, enzymatically degraded starches are used. Under the digestion conditions stated there for natural starch, a relatively large amount of degradation products (degradation rates>10%) are found in addition to incomplete digestion (spectroscopic investigations indicate undissolved starch grains, some of which are only swollen).

U.S. Pat. No. 4,880,497 and U.S. Pat. No. 4,978,427 disclose a process for the production of paper having high dry and wet strength, in which a hydrolyzed copolymer which is obtainable by copolymerizing N-vinylformamide and ethylenically unsaturated monomers, for example vinyl acetate, vinyl propionate or an alkyl vinyl ether, and hydrolyzing from 30 to 100 mol % of the formyl groups of the copolymer with formation of amino groups is added as a strength agent, either to the surface of the paper or to the paper stock prior to sheet formation. The hydrolyzed copolymers are used in amounts of from 0.1 to 5% by weight, based on dry fibers.

DE-A-4 127 733 discloses hydrolyzed graft polymers of natural substances containing N-vinylformamide and saccharide structures, said graft polymers being used as dry and wet strength agents. However, the hydrolysis of the graft polymers under acidic conditions results in a considerable reduction in the molecular weight of the saccharides.

OBJECTS OF THE INVENTION

FR-A-2054739 discloses a process for reacting starch with polyamines which have a molar mass of at least 1000. The reaction is carried out in aqueous suspension at from 60° to 121° C. in the course of from a quarter of an hour to 10 hours.

SUMMARY OF THE INVENTION

It is an object of the present invention to achieve a more substantial cationic modification of starch compared with the known processes. It is a further object of the present invention to provide dry and wet strength agents for paper which are improved compared with the prior art.

We have found that these objects are achieved, according to the invention, by a process for cationically modifying starch by reacting starch with polymers which contain amino and/or ammonium groups in an aqueous medium at above the glutinization temperature of the starch in the absence of oxidizing agents, polymerization initiators and alkali, if the reaction is carried out at from 115° to 180° C. under superatmospheric pressure in a manner such that at least 90% by weight of the starch used are digested and a reduction in molecular weight occurs in not more than 10% by weight of the starch used.

All starches, for example natural starches selected from the group consisting of cornstarch, potato starch, wheat starch, rice starch, tapioca starch, sago starch, sorghun [sic] starch, cassava starch and pea starch or a mixture of the stated natural starches, may be used in the novel process. Particularly preferably used starches are those which have an amylopectin content of at least 95% by weight. Starches containing at least 99% by weight of amylopectin are preferred. Such starches can be obtained, for example, by starch fractionation of conventional natural starches or by culture measures from those plants which produce virtually pure amylopectin starch, cf. Günther Tegge, Stärke und Stärkederivate, Hamburg, Bers-Verlag All polymers which contain amino and/or,ammonium groups are suitable for the novel process. These compounds are referred to below as cationic polymers. Some of them are known from the publications stated in connection with the prior art, for example. EP-B-0 282 761, EP-B-0 301 372 and EP-B-0 418 343.

Suitable cationic polymers are, for example, homo- and copolymers containing vinylamine units. Polymers of this type are prepared by known processes, by polymerizing N-vinylcarboxamides of the formula

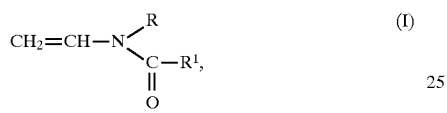

where R and $R^1$ are each H or $C_1$–$C_6$-alkyl, alone or in the presence of other monomers copolymerizable therewith, and hydrolyzing the resulting polymers with acids or bases with elimination of the group

and with formation of units of the formula

where R has the meanings stated for the formula (I).

Suitable monomers of the formula (I) are, for example, N-vinylformamide, N-vinyl-N-methylformamide, N-vinyl-N-ethylformamide, N-vinyl-N-propylformamide, N-vinyl-N-isopropylformamide, N-vinyl-N-butylformamide, N-vinyl-N-sec-butylformamide, N-vinyl-N-tert-butylformamide, N-vinyl-N-pentylformamide, N-vinylacetamide, N-vinyl-N-ethylacetamide and N-vinyl-N-methylpropionamide. N-Vinylformamide is preferably used in the preparation of polymers which contain polymerized units of the formula (III).

The hydrolyzed polymers which contain units of the formula (III) have K values of from 15 to 300, preferably from 30 to 200, determined according to H. Fikentscher in 5% strength by weight aqueous sodium chloride solution at pH 7, at 25° C. and at a polmer concentration of 0.5% by weight. Hydrolyzed copolymers of the monomers (I) contain, for example, 1) from 99 to 1 mol % of N-vinylcarboxamides of the formula (I) and
2) from 1 to 99 mol % of other, monoethylenically unsaturated monomers copolymerizable therewith, such as vinyl esters of saturated carboxylic acids of 1 to 6 carbon atoms, e.g. vinyl formate, vinyl acetate, vinyl propionate and vinyl butyrate. Also suitable are unsaturated $C_3$–$C_6$-carboxylic acids, e.g. acrylic acid, methacrylic acid, maleic acid, crotonic acid, itaconic acid and vinylacetic acid and the alkali metal and alkaline earth metal salts, esters, amides and nitriles thereof, for example methyl acrylate, methyl methacrylate, ethyl acrylate and ethyl methacrylate, or with [sic] glycol or polyglycol esters of ethylenically unsaturated carboxylic acids, only one OH group of the glycols and polyglycols being esterified in each case, e.g. hydroxyethyl acrylate, hydroxyethyl methacrylate, hydroxypropyl acrylate, hydroxybutyl acrylate, hydroxypropyl methacrylate, hydroxybutyl methacrylate and the monoesters of acrylic acid with polyalkylene glycols having a molecular weight of from 1500 to 10,000. Also suitable are the esters of ethylenically unsaturated carboxylic acids with amino alcohols, e.g. dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate, diethylaminopropyl methacrylate, dimethylaminobutyl acrylate and diethylaminobutyl acrylate. The basic acrylates are used in the form of the free bases, of the salts with mineral acids, e.g. hydrochloric acid, sulfuric acid and nitric acid, or of the salts with organic acids, such as formic acid or benzenesulfonic acid, or in quaternized form. Suitable quaternizing agents are, for example, dimethyl sulfate, diethyl sulfate, methyl chloride, ethyl chloride and benzyl chloride.

Other suitable comonomers 2) are unsaturated amides, for example acrylamide, methacrylamide and N-alkylmonoamides and N-alkyldiamides having alkyl radicals of 1 to 6 carbon atoms, e.g N-methylacrylamide, N,N-dimethylacrylamide, N-methylmethacrylamide, N-ethylacrylamide, N-propylacrylamide and tert-butylacrylamide, and basic (meth)acrylamides, such as dimethylaminoethylacrylamide, dimethylaminoethylmethacrylamide, diethylaminoethylacrylamide, diethylaminoethylmethacrylamide, dimethylaminopropylacrylamide, diethylaminopropylacrylamide, dimethylaminopropylmethacrylamide and diethylaminopropylmethacrylamide.

Other suitable comonomers are N-vinylpyrrolidone, N-vinylcaprolactam, acrylonitrile, methacrylonitrile, N-vinylimidazole and substituted N-vinylimidazoles, such as N-vinyl-2-methylimidazole, N-vinyl-4-methylimidazole, N-vinyl-5-methylimidazole and N-vinyl-2-ethylimidazole, and N-vinylimidazolines, such as vinylimidazoline, N-vinyl-2-methylimidazoline and N-vinyl-2-ethylimidazoline. N-vinylimidazoles and N-vinylimidazolines are used not only in [lacuna] form of the free bases but also in the form neutralized with mineral acids or organic acids or in quaternized form, quaternization preferably being effected with dimethyl sulfate, diethyl sulfate, methyl chloride or benzyl chloride.

Further suitable comonomers 2) are sulfo-containing monomers, for example vinylsulfonic acid, allylsulfonic acid, methallylsulfonic acid, styrenesulfonic acid and 3-sulfopropyl acrylate.

When basic comonomers 2) are used, for example basic acrylates and acrylamides, it is often possible to dispense with hydrolysis of the N-vinylcarboxamides. The copolymers comprise terpolymers and those polymers which additionally contain at least one further monomer as polymerized units.

Hydrolyzed copolymers of
1) N-vinylformamide and 2) vinyl formate, vinyl acetate, vinyl propionate. [sic] acrylonitrile and N-vinylpyrrolidone and hydrolyzed homopolymers of N-vinylformamide having a degree of hydrolysis of from 2 to 100, preferably from 30 to 95, mol % are preferred.

In the case of copolymers which contain polymerized vinyl ester units, hydrolysis of the ester groups with formation of vinyl alcohol units takes place in addition to the hydrolysis of the N-vinylformamide units. Polymerized acrylonitrile units are likewise chemically changed in the hydrolysis, for example amido and/or carboxyl groups are formed.

Furthermore, compounds containing polymerized ethyleneimine units are suitable as cationic polymers. These are preferably polyethyleneimines which are obtainable by polymerizing ethyleneimine in the presence of acidic catalysts, such as ammonium hydrogen sulfate, hydrochloric acid or chlorinated hydrocarbons, such as methyl chloride, ethylene chloride, carbon tetrachloride or chloroform. Such polyethyleneimines have, for example, a viscosity of from 500 to 33,000, preferably from 1000 to 31000, mPa.s in 50% strength by weight aqueous solution (measured according to Brookfield at 20° C. and 20 rpm). The polymers of this group include polyamidoamines which are grafted with ethyleneimine and may furthermore be crosslinked by reaction with a bifunctional or polyfunctional crosslinking agent. Products of this type are prepared, for example, by condensation of a dicarboxylic acid, such as adipic acid, with a polyalkylenepolyamine, such as diethylenetriamine or triethylene tetramine, grafting with ethyleneimine and reaction with a bifunctional or polyfunctional crosslinking agent, e.g. a bischlorohydrin ether of a polyalkylene glycol, c.f. U.S. Pat. No. 4,144,123 and U.S. Pat. No. 3,642,572.

Polymers which contain diallyldimethylammonium chloride as a characteristic monomer unit are also suitable for starch modification. Polymers of this type are known. Polymers of diallyldimethylammonium chloride are to be understood as meaning primarily homopolymers and copolymers with acrylamide and/or methacrylamide. Copolymerization may be carried out using any desired monomer ratio. The K value of the homo- and copolymers of diallyldimethylammonium chloride is at least 30, preferably from 95 to 180.

Other suitable cationic polymers are homo- and copolymers of substituted or unsubstituted N-vinylimidazolines. These are likewise known substances. They can be prepared, for example, according to the process of DE-B-1 182 826, by polymerizing compounds of the formula

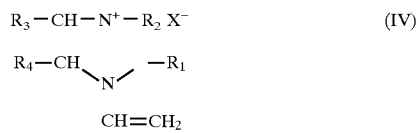

where $R_1$ and $R_2$ are each H, $C_1$–$C_{18}$-alkyl, benzyl or aryl, $R_3$ and $R_4$ are each H or $C_1$–$C_4$-alkyl and $X^-$ is an acid radical, if desired together with acrylamide and/or methacrylamide, in an aqueous medium at a pH of from 0 to 8, preferably from 1.0 to 6.8, in the presence of polymerization initiators which decompose into free radicals. 1-Vinyl-2-imidazoline salts of the formula (V),

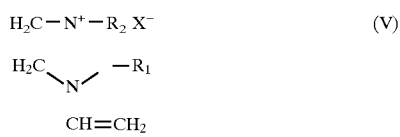

where $R_1$ and $R_2$ are each H, $CH_3$, $C_2H_5$, n—$C_3H_7$, iso—$C_3H_7$ or $C_6H_5$ and $X^-$ is an acid radical, are preferably used in the polymerization. $X^-$ is preferably $Cl^-$, $Br^-$, $So_4^{2-}$ [sic], $CH_3$—O—$SO_3^-$ or R—$COO^-$ and $R_2$ is H, $C_1$–$C_4$-alkyl or aryl.

$X^-$ in the formulae (IV) and (V) can in principle be any desired acid radical of an inorganic or of an organic acid. The monomers of the formula (IV) are obtained by neutralizing the free bases, i.e. 1-vinyl-2-imidazolines, with an equivalent amount of an acid. The vinylimidazolines can also be neutralized, for example, with trichloroacetic acid, benzenesulfonic acid or toluenesulfonic acid. In addition to salts of 1-vinyl-2-imidazolines, quaternized 1-vinyl-2-imidazolines are also suitable. They are prepared by reacting 1-vinyl-2-imidazolines, which may be unsubstituted or substituted in the 2-, 4- and 5-positions, with known quaternizing agents. Examples of suitable quaternizing agents are $C_1$–$C_{18}$-alkyl chlorides or bromides, benzyl chloride or bromide, epichlorohydrin, dimethyl sulfate and diethyl sulfate. Epichlorohydrin, benzyl chloride, dimethyl sulfate and methyl chloride are preferably used.

In the preparation of the water-soluble homopolymers, the compounds of the formulae (IV) and (V) are preferably polymerized in an aqueous medium.

Since the compounds of the formula (IV) are relatively expensive, copolymers of compounds of the formula (IV) with acrylamide and/or methacrylamide are preferably used as cationic polymers for economic reasons. These copolymers then contain the compounds of the formula (IV) only in effective amounts, i.e. in an amount of from 1 to 50, preferably from 10 to 40, % by weight. Copolymers of from 60 to 85% by weight of acrylamide and/or methacrylamide and from 15 to 40% by weight of N-vinylimidazoline or N-vinyl-2-methylimidazoline are particularly suitable for modifying natural starches. The copolymers may furthermore be modified by incorporating other monomers, such as styrene, N-vinylformamide, vinyl formate, vinyl acetate, vinyl propionate, $C_1$–$C_4$-alkyl vinyl ether, N-vinylpyridine, N-vinylpyrrolidone, N-vinylimidazole, ethylenically unsaturated $C_3$–$C_5$-carboxylic acids and esters, amides and nitriles thereof, sodium vinylsulfonate, vinyl chloride and vinylidine chloride, as polymerized units in amounts of up to 25% by weight. Copolymers which contain 1) from 70 to 97% by weight of acrylamide and/or methacrylamide,
2) from 2 to 20% by weight of N-vinylimidazoline or N-vinyl-2-methylimidazoline and
3) from 1 to 10% by weight of N-vinylimidazole as polymerized units are particularly suitable for modifying natural starches. These copolymers are prepared by free radical copolymerization of the monomers 1), 2) and 3) by known polymerization methods. They have K values of from 80 to 150 (determined according to H. Fikentscher in 5% strength by weight aqueous sodium chloride solution at 25° C. and at a polymer concentration of 0.5% by weight).

Further suitable cationic polymers are copolymers of from 1 to 99, preferably from 30 to 70, mol % of acrylamide and/or methacrylamide and from 99 to 1, preferably from 70 to 30, mol % of dialkylaminoalkyl acrylates and/or methacrylates, for example copolymers of acrylamide and N,N-dimethylaminoethyl acrylate or N,N-diethylaminoethyl acrylate. Basic acrylates are preferably in the form neutralized with acids or in quaternized form. Quaternization can be effected, for example, with methyl chloride or with dimethyl sulfate. The cationic polymers have K values of from 30 to 300, preferably from 100 to 180 (determined according to H. Fikentscher in 5% strength by weight aqueous sodium chloride solution at 25° C. and at a polymer concentration of 0.5% by weight). At a pH of 4.5, they have a charge density of at least 4 meq/g of polyelectrolyte.

Copolymers of from 1 to 99, preferably from 30 to 70, mol % of acrylamide and/or methacrylamide and from 99 to 1, preferably from 70 to 30, mol % of dialkylaminoalkyl acrylamide and/or dialkylaminoalkyl methacrylamide are also suitable. The basic acrylamides and methacrylamides are also preferably in the form neutralized with acids or in quaternized form. Examples are N-trimethylammoniumethylacrylamide chloride, N-trimethylammoniumethylmethacrylamide chloride, trimethylammoniumethylacrylamide methosulfate, trimethylammoniumethylmethacrylamide methosulfate, N-ethyldimethylammoniumethylacrylamide ethosulfate, N-ethyldimethylammoniumethylmethacrylamide ethosulfate, trimethylammoniumpropylacrylamide chloride, trimethylammoniumpropylmethacrylamide chloride, trimethylammoniumpropylacrylamide methosulfate, trimethylammoniumpropylmethacrylamide methosulfate and N-ethyldimethylammoniumpropylacrylamide ethosulfate. Trimethylammoniumpropylmethacrylamide chloride is preferred.

Polyallylamines are also suitable as cationic polymers. Polymers of this type are obtained by homopolymerization of allylamine, preferably in the form neutralized with acids or in quaternized form, or by copolymerization of allylamine with other monoethylenically unsaturated monomers, similarly to the copolymers with N-vinylcarboxamides described above. Homo- and copolymers of diallyldimethylammonium chloride are preferred.

For the novel cationic modification of starch, for example, an aqueous suspension of at least one starch type is reacted with a cationic polymer or with a plurality of the cationic polymers at from 115° to 180° C., preferably from 120° to 145° C. under superatmospheric pressure, the reaction being carried out in a manner such that a reduction in molecular weight occurs in not more than 10% by weight of the starch. The aqueous suspensions of starch contain, for example, from 0.1 to 10, preferably from 2 to 6, % by weight of starch, per 100 parts by weight of water. For example, from 0.1 to 100, preferably from 1 to 10, parts by weight of at least one cationic polymer are used per 100 parts by weight of starch. Preferred cationic polymers are partially or completely hydrolyzed homo- or copolymers of N-vinylformamide, polyethyleneimines and/or polyallylamine.

On heating the aqueous starch suspensions in the presence of cationic polymers, initially the starch is digested. Starch digestion is understood as meaning the conversion of the solid starch grains into a water-soluble form, superstructures (helix formation, intramolecular hydrogen bridges, etc.) being eliminated without the amylose and/or amylopectin units which form the starch being degraded into oligosaccharides or glucose. The aqueous starch suspensions which contain a cationic polymer in dissolved form are heated in the reaction to above the glutinization temperature of the starches. In the novel process, the starch used is digested to an extent of at least 90, preferably >95% by weight and modified with the cationic polymer. The starch has dissolved to form a clear solution. After the reaction of the starch, preferably no more unconverted starch can be filtered off from the reaction solution with the use of a cellulose acetate membrane having a pore diameter of 1.2 μm.

The reaction is carried out at superatmospheric pressure. This is usually the pressure which the reaction medium develops in the temperature range from 115° to 180° C. It is, for example, from 1 to 10 preferably from 1.2 to 7.9, bar. During the reaction, the reaction mixture is subjected to shearing. If the reaction is carried out in a stirred autoclave, the reaction mixture is stirred, for example at from 100 to 2000, preferably from 200 to 1000, revolutions per minute. The reaction can be carried out in virtually all apparatuses in which starch is digested in industry, for example in a jet digester. The residence time of the reaction mixture at the temperatures of from 115° to 180° C. to be used according to the invention are, for example, from 0.1 second to 1 hour, preferably from 0.5 second to 30 minutes.

Under these conditions, at least 90% of the starch used are digested and modified, but the degree of degradation of the starches (reduction in molecular weight) is substantially lower compared with the prior art. It is not more than 10% by weight of the starch used. In the novel reaction, preferably less than 5% by weight of the starch are degraded. Analyses of the starch digestions by gel permeation chromatography permit quantitative monitoring of the degree of degradation of the starch. The degree of starch digestion of the swollen starch grain to completely dissolve the starch can be determined with the aid of investigations by microscopy and electron microscopy.

The natural starch types may also be subjected to a pretreatment, for example may be oxidatively, hydrolytically or enzymatically degraded or chemically modified. Here too, the waxy starches, such as waxy potato starch and waxy cornstarch, are of particular interest.

For example, at a solids concentration of 3.5% by weight, the reaction products obtainable by the novel process have a viscosity of from 50 to 10,000, preferably from 80 to 4000, mPa.s, measured in a Brookfield viscometer at 20 revolutions per minute and at 20° C. The pH of the reaction mixtures is, for example, from 2.0 to 9.0, preferably from 2.5 to 8.

The modified starches obtainable by the novel process are used as dry strength agents for paper. The starches cationically modified according to the invention are preferably added to the paper stock in an amount of from 0.5 to 3.5, in particular from 1.2 to 2.5, % by weight, based on dry paper stock, or are applied to the surface of a formed sheet. Preferably, the modified starches prepared according to the invention are added to the paper stock. They have good retention in the paper stock and, compared with known modified starches of the prior art, have the advantage that the COD (chemical oxygen demand) of the waste water is lower when they are used.

The reaction products to be used according to the invention as dry strength agents and obtained from starches and cationic polymers can be used in the production of all known paper, board and cardboard qualities, for example writing, printing and packaging papers. The papers may be produced from a large number of fiber materials of different types, for example from sulfite or sulfate pulp in the bleached or unbleached state, groundwood, waste paper, thermomechanical pulp (TMP) and chemothermomechanical pulp (CTMP). The pH of the stock suspension is, for example, from 4 to 10, preferably from 6 to 8.5. The dry strength agent may be used both in the production of base paper for papers having a low basis weight (LWC papers) and for cardboard. The basis weight of the papers is from 30 to 200, particularly from 35 to 150, g/m$^2$, whereas it may be up to 600 g/m$^2$ in the case of cardboard. Compared with those papers which were produced in the presence of an identical amount of natural starch, the paper products produced according to the invention have a markedly improved strength, which can be quantified, for example, on the basis of the breaking length, of the bursting pressure, of the CMT value and of the tear propagation strength.

In the examples which follow, parts and percentages are by weight. The viscosities of the strength agents were determined in aqueous solution at a solids concentration of 3.5% by weight and at 20° C. in a Brookfield viscometer at 20 rpm.

The sheets were produced in a Rapid Köthen laboratory sheet former. The dry breaking length was determined according to DIN 53 112, Sheet 1, and the dry bursting pressure according to Mullen, in DIN 53 141.

The sheets were each tested after conditioning for 24 hours at 23° C. and a relative humidity of 50%.

The K value of the polymers was determined according to H. Fikentscher, Cellulose-Chemie, 13 (1932), 58–64 and 71–74, at 25° C. in a 5% strength sodium chloride solution and at a polymer concentration of 0.5% by weight. $K=k \times 10^3$.

EXAMPLES

Polymer 1

Homopolymer of N-vinylformamide having a K value of 85, from which 95% of the formyl groups were eliminated by hydrolysis with hydrochloric acid, in 12% strength aqueous solution having a pH of 5.

Polymer 2

High molecular weight polyethyleneimine in 50% strength aqueous solution having a viscosity of 28,000 mPa.s.

EXAMPLE 1

(Strength agent 1)

A 50% strength aqueous solution of polymer 1 is added to a 3% strength suspension of natural potato starch in water, so that the resulting mixture contains 10% by weight of polymer 1, based on the natural starch used. The mixture is heated for 20 minutes while stirring at 500 rpm at 130° C. and 2.7 bar and, after cooling to 25° C., is used, according to the invention, as a dry strength agent for paper. The reduction in the molecular weight of the starch is <5%. Investigations by microscopy or electron microscopy show that coarse or swollen starch grains are no longer present, i.e. the starch has been completely digested.

EXAMPLE 2

(Strength agent 2)

A dry strength agent is prepared as described in the case of strength agent 1, by reacting polymer 1 with natural cornstarch. The reduction in the molecular weight of the starch was less than 4%. The starch had been virtually completely digested.

EXAMPLE 3

(Strength agent 3)

A dry strength agent is prepared as described in the case of strength agent 1, by reacting polymer 1 with natural cornstarch, 97% of the starch having been digested and 3% of the starch having undergone a reduction in molecular weight.

EXAMPLE 4

(Strength agent 4)

A dry strength agent is prepared as described in the case of strength agent 1, by reacting polymer 1 with natural waxy cornstarch, 2% of the starch having been degraded and 98% of the starch having been digested.

EXAMPLE 5

(Strength agent 5)

A dry strength agent is prepared as described in the case of strength agent 1, by reacting polymer 1 with natural waxy potato starch, 4% of the starch having been degraded and 96% of the starch having been digested.

EXAMPLE 6

(Strength agent 6)

A dry strength agent is prepared as described in the case of strength agent 1, in this case by reacting polymer 2, instead of the polymer 1 described there, with natural waxy potato starch, 3% of the starch having been degraded and 97% of the starch having been digested.

EXAMPLE 7

(Strength agent 7)

A dry strength agent is prepared as described in the case of strength agent 1, by reacting polymer 2 with natural cornstarch, 2% of the starch having been degraded and 98% of the starch having been digested.

EXAMPLE 8

(Strength agent 8)

A dry strength agent is prepared as described in the case of strength agent 1, by reacting polymer 2 with natural wheat starch, 1% of the starch having been degraded and 99% of the starch having been digested.

EXAMPLE 9

(Strength agent 9)

A dry strength agent is prepared as described in the case of strength agent 1, by reacting polymer 2 with natural waxy cornstarch, 2% of the starch having been degraded and 98% of the starch having been digested.

EXAMPLE 10

(Strength agent 10)

A dry strength agent is prepared as described in the case of strength agent 1, by reacting polymer 2 with natural waxy potato starch, 4% of the starch having been degraded and 96% of the starch having been digested.

Strength agent 11 (Comparison)

A dry strength agent is prepared according to EP-B-0 282 761, Example 7, by reacting polymer 1 with natural potato starch by the process described there. The degree of degradation of the starch was less than 5%, and only 65% of the starch had been digested.

Strength agent 12 (Comparison)

A dry strength agent is prepared according to DE-A-3 719 480, Example 1, by reacting polymer 2 with natural potato starch by the process described there. The degree of degradation of the starch was less than 4%, and only 68% of the starch had been digested.

EXAMPLE 11

Sheets having a basis weight of 120 g/m³ [sic] are produced in a Rapid Köthen sheet former. The paper stock consists of 80% of mixed waste paper and 20% of bleached beech sulfite pulp which is beaten at 50° Schopper-Riegler and to which the strength agent 1 described above is added in an amount such that the solids content with respect to strength agent 1 is 2.2%, based on dry paper stock. The pH of the stock suspension is brought to 7.5. The sheets produced from this stock model are conditioned and the dry breaking length and the dry bursting pressure are then measured by the abovementioned methods. The results are shown in Table 1.

EXAMPLES 12 to 20

Example 11 is repeated, except that, instead of the strength agent described therein, the strength agents shown in Table 1 are used. The results thus obtained are shown in Table 1.

EXAMPLE 21

Example 11 is repeated, except that, instead of the strength agent described therein, 3% of digested natural cornstarch and 0.3% of polymer 1 are used successively. The results thus obtained are shown in Table 1.

EXAMPLE 22

Example 11 is repeated, except that, instead of the strength agent described therein, 3% of digested natural waxy cornstarch and 0.3% of polymer 1 are used successively. The results thus obtained are shown in Table 1.

EXAMPLE 23

Example 11 is repeated, except that, instead of the strength agent described therein, 3% of digested natural potato starch and 0.3% of polymer 2 are used successively. The results thus obtained are shown in Table 1.

EXAMPLE 24

Example 11 is repeated, except that, instead of the strength agent described therein, 3% of digested natural wheat starch and 0.3% of polymer 2 are used successively. The results thus obtained are shown in Table 1.

Comparative Example 1

Example 11 is repeated, except that, instead of the strength agent described therein, strength agent 11 is used. The results thus obtained are shown in Table 1.

Comparative Example 2

Example 11 is repeated, except that, instead of the strength agent described therein, strength agent 12 is used. The results thus obtained are shown in Table 1.

Comparative Example 3

Example 11 is repeated, except that, instead of the strength agent described therein, 3% of commercial cationically modified starch HI-CAT (Roquette) are used. The results thus obtained are shown in Table 1.

Comparative Example 4

Example 11 is repeated, except that, instead of the strength agent described therein, only 3%, based on dry fiber, of natural potato starch are used. The results thus obtained are shown in Table 1.

Comparative Example 5

Example 11 is repeated, except that, instead of the strength agent described therein, only 3%, based on dry fiber, of natural cornstarch are used. The results thus obtained are shown in Table 1.

Comparative Example 6

Example 11 is repeated, except that, instead of the strength agent described therein, only 3% of natural waxy cornstarch are used. The results thus obtained are shown in Table 1.

Comparative Example 7

Example 11 is repeated, except that, instead of the strength agent described therein, only 3% of natural wheat starch are used. The results thus obtained are shown in Table 1.

Comparative Example 8

Example 11 is repeated, except that, instead of the strength agent described therein, only 3% of polymer 1 are used. The results thus obtained are shown in Table 1.

Comparative Example 9

Example 11 is repeated, except that, instead of the strength agent described therein, only 3% of polymer 2 are used. The results thus obtained are shown in Table 1.

Comparative Example 10

Example 11 is repeated, except that no strength agent is added. The results thus obtained are shown in Table 1.

TABLE 1

| Example | Strength agent added to the paper stock | Dry breaking length [m] | Dry bursting pressure [kPa] |
| --- | --- | --- | --- |
| 11 | 1 | 3556 | 248 |
| 12 | 2 | 3642 | 248 |
| 13 | 3 | 3704 | 260 |
| 14 | 4 | 3748 | 255 |
| 15 | 5 | 3796 | 257 |
| 16 | 6 | 3549 | 239 |
| 17 | 7 | 3283 | 225 |
| 18 | 8 | 3344 | 223 |
| 19 | 9 | 3425 | 233 |
| 20 | 10 | 3602 | 244 |
| 21 | Polymer 1/Cornstarch | 3057 | 200 |
| 22 | Polymer 1/waxy cornstarch | 3069 | 206 |
| 23 | Polymer 1/potato starch | 3162 | 211 |
| 24 | Polymer 2/wheat starch | 2225 | 202 |
| Comp.Ex. 1 | 11 | 3037 | 173 |
| Comp.Ex. 2 | 12 | 3186 | 167 |
| Comp.Ex. 3 | HI-CAT (Roquette) | 2954 | 215 |
| Comp.Ex. 4 | Potato starch | 3055 | 193 |
| Comp.Ex. 5 | Cornstarch | 3111 | 205 |
| Comp.Ex. 6 | Waxy cornstarch | 3147 | 195 |
| Comp.Ex. 7 | Wheat starch | 3047 | 192 |
| Comp.Ex. 8 | Polymer 1 | 3015 | 191 |
| Comp.Ex. 9 | Polymer 2 | 2835 | 178 |
| Comp.Ex. 10 | None | 2607 | 173 |

We claim:

1. A process for cationically modifying a starch, comprising:

reacting a starch with at least one polymer comprising amino and/or ammonium groups in an aqueous medium at above the glutinization temperature of the starch, in the absence of oxidizing agents, polymerization initiators and alkali, wherein the reaction is conducted at 115° to 180° C. under superatmospheric pressure; at least 90% by weight of the starch is digested; and the molecular weight of not more than 10% by weight of the starch is reduced.

2. A process as claimed in claim 1, wherein said starch is selected from the group consisting of cornstarch, potato starch, wheat starch, rice starch, tapioca starch, sago starch, sorghum starch, cassava starch, pea starch and mixtures thereof.

3. A process as claimed in claim 1, wherein said starch has an amylopectin content of at least 95% by weight.

4. A process as claimed in claim 1, wherein said starch is selected from the group consisting of waxy cornstarch, waxy potato starch, waxy wheat starch and mixtures thereof.

5. A process as claimed in claim 1, wherein from 0.1 to 100 parts by weight of at least one cationic polymer are used per 100 parts by weight of starch.

6. A process as claimed in claim 1, wherein from 1 to 10 parts by weight of at least one cationic polymer are used per 100 parts by weight of starch.

7. A process as claimed in claim 1, wherein said cationic polymers are partially or completely hydrolyzed homo- or copolymers of N-vinylformamide, polyethyleneimine and/or polyalkyleneamines.

8. A dry strength agent for papermaking, comprising a modified starch prepared by a process as claimed in claim 1.

* * * * *